United States Patent [19]

Gonska et al.

[11] Patent Number: 4,769,939
[45] Date of Patent: Sep. 13, 1988

[54] COMBINATION FISHING DEVICE

[76] Inventors: Joseph A. Gonska, Box 251, Merrifield, Minn. 56465; Roger L. Smith, 10401 Terrace Rd., Blaine, Minn. 55434

[21] Appl. No.: 125,945

[22] Filed: Nov. 27, 1987

[51] Int. Cl.$^4$ .............................................. A01K 97/01
[52] U.S. Cl. ................................................. 43/4; 43/5
[58] Field of Search ...................... 43/5; 403/109, 106, 403/107; 294/19.1; 7/106, 170

[56] References Cited

U.S. PATENT DOCUMENTS

| | | | |
|---|---|---|---|
| 2,460,970 | 2/1949 | Bridges | 483/107 |
| 3,150,460 | 9/1964 | Dees | 43/4 |
| 3,722,940 | 3/1973 | Misjak | 43/4 |
| 3,747,253 | 7/1973 | Gangi et al. | 43/4 |
| 4,037,554 | 7/1977 | Foscolo | 114/221 |
| 4,263,864 | 4/1981 | Carter | 114/221 |

FOREIGN PATENT DOCUMENTS 118901  1/1944  Fed. Rep. of Germany ............ 43/5
698598 11/1979  U.S.S.R. .

Primary Examiner—Nicholas P. Godici
Assistant Examiner—Karen Skillman
Attorney, Agent, or Firm—Leo Gregory

[57] ABSTRACT

A combination fishing device consisting of an ice skimmer and gaff respectively mounted on extensibly connected handles, and a spring latch carried by one of the handles, when the handles are extended, engages an annular groove in the other handle and automatically releasably latches said handles in extended position.

7 Claims, 2 Drawing Sheets

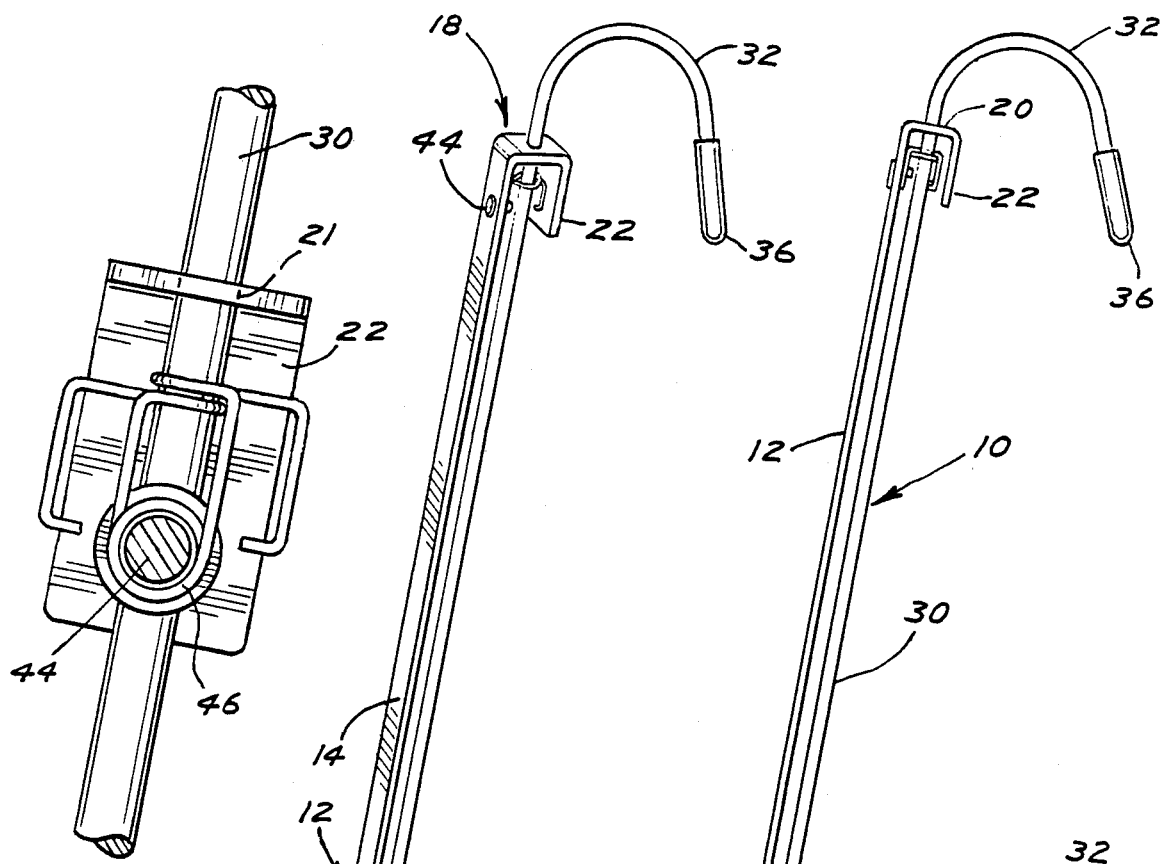
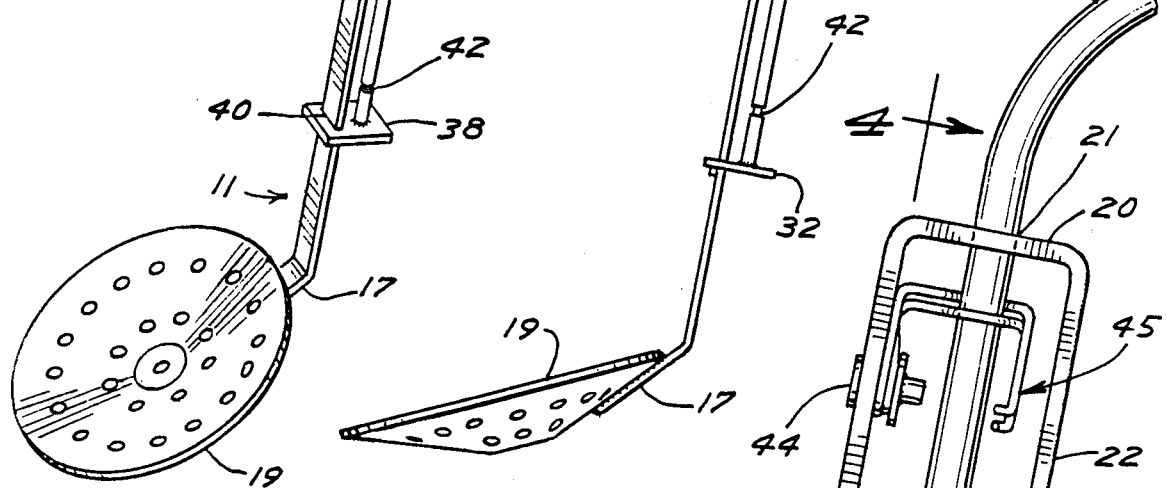
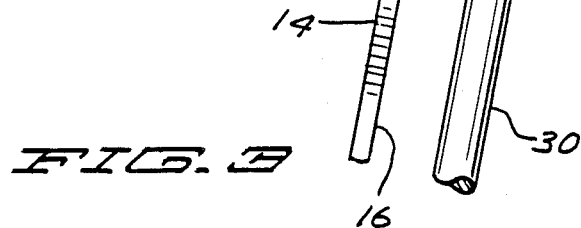

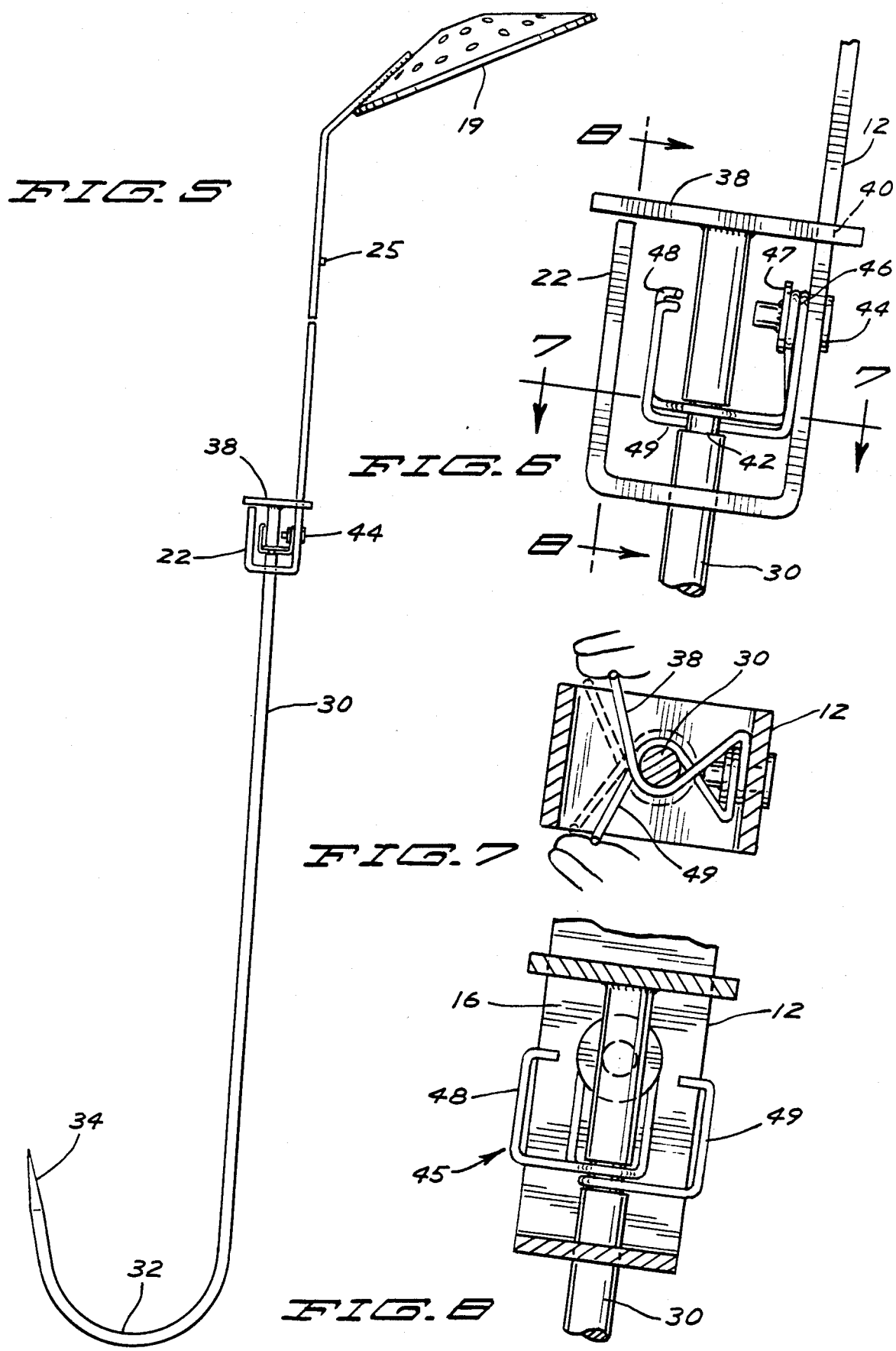

COMBINATION FISHING DEVICE

BACKGROUND OF THE INVENTION

1. Field of Invention

This invention relates to fishing gear and more particularily to a combination ice skimmer and gaff.

2. Brief Description of the Prior Art

The use of ice skimmers or scoops and gaffs are well known to ice fishermen. It is known in the prior art to combine these for use on a single handle and also to combine a skimmer or a gaff with other items of fishing gear.

In the RUSSIAN Pat. No. SU 0698598, a scoop is shown at one end of a handle and gaff at the other end thereof, the handle being hinged for storage purposes and is manually locked in extended position.

In U.S. Pat. No. 4,263,864, there is shown in connection with a net and a retrievable hook, a handle formed of telescopic tubes which require a packing gland at their adjoining ends and a ferrule is used to secure the adjacent ends of extended tubes. The ferule is required to be rotated by hand to secure the tubes.

Thus in the prior art indicated, the hands of the operator are required to secure the handles in extended operating position.

SUMMARY OF THE INVENTION

This invention of an extensible handle carrying a gaff and a skimmer is very simply operated by merely extending the handle portions and they automatically are spring latched in extended operating position.

The handle structure herein has overlapping handle portions and means for retaining them in such position, one overlapping end portion carries a latch spring and the overlapping end of the other handle portion has an annular groove therein. The spring latch is normally held under pressure in a non-operating position by the rod of the other handle portion and upon extension of the handle portions and the alignment of said latch and said groove, said latch enters into the groove in a releasable self locking position. Thus all that is required to place the extended handle portions in a locked operating position, is that the handle portions be extended, no manual locking effort being required.

There and other objects and advantages of the invention will be set forth in the following description made in connection with the accompanying drawings in which the reference characters refer to similar parts throughout the several views.

BRIEF DESCRIPTION OF THE DRAWINGS

FIG. 1 is an elevated view in perspective;

FIG. 2 is a view in side elevation;

FIG. 3 is a broken view of a detail of structure in side elevation on an enlarged scale;

FIG. 4 is a broken view in vertical section taken in line 4—4 of FIG. 3 as indicated;

FIG. 5 is a view in side elevation with the invention shown in extended position positioned reversely of the view in FIG. 2;

FIG. 6 is a broken view of a detail of a structure in side elevation on an enlarged scale;

FIG. 7 is a view in horizontal section taken on line 7—7 of FIG. 6 as indicated; and FIG. 8 is a view in vertical section taken on line 8—8 of FIG. 6 as indicated.

DESCRIPTION OF A PREFERRED EMBODIMENT

Referring to the drawings and particularily to FIGS. 1, 2 and 5, the invention herein comprises a combination ice scoop or skimmer and gaff or gaff hook and is indicated generally by the reference character 10.

Said invention as here shown comprises an ice skimmer 11 having a handle portion 12 formed as a flat plate rod having a front wall 14 and a rear wall 16. Said rod is reversely angled at its upper end as at 18, the angled portion having a top wall 20 and an angled tip portion 22. Said top wall has a hole 21 therethrough.

The lower end of said handle portion 12 has an angled terminal portion 17 having a disc like or circular shallow scoop or skimmer 19 secured thereto as by welding.

Overlapping or being partially coextensive with said handle portion 12 is a handle portion 30 having at its upper end a reversely curved portion 32 terminating in a hook or gaff 34, secured over the top of said gaff is a friction held safety cap 36.

Said handle 30 is formed of a cylindrical rod which is disposed through said hole 21 to extend along said handle 12.

To the lower end of said handle 30 is secured as by welding flat plate 38 which is normal to the axis of said handle and has a slot 40 therethrough and the handle 12 is disposed through said slot.

Thus said hole 21 and said slot 40 position said handles 12 and 30 to be in an extensible operating position.

With the handles 12 and 30 in retracted position as in FIGS. 1 and 2, a small projection 25 struck out of the handle 12 and extending outwardly of the front wall 14 of said handle forms a stop member for the retracted position of the handle 30 relative to the handle 12.

Said handle 30 at its lower end portion spaced somewhat from said plate 38 has an annular groove 42.

Said handle 30 at its upper end portion spaced from said top wall 20 has an inwardly extending pin 44 secured as by welding and has secured thereto a wire locking spring 45. Said spring has a lower body portion coiled about said pin 44 as at 46 and securing said coils is an overlying lock washer 47.

Said spring comprises outwardly and upwardly reversely angled arm portions 48 and 49. Said arm portions are caused under tension to overlap one another as shown in FIGS. 6–8 and are held in such overlapping position, as in FIG. 7, by said handle 30 being disposed there between.

Thus when the handle 30 is extended relative to the handle 12 as the groove 42 is moved into alignment with said overlapping spring portions 48 and 49, said spring portions, being under tension, snap into and enter said groove automatically to releasably latch said handle portion 30 in its extended position.

To release said handle portion 30, said angled spring portion 48 and 49 are merely pressed together by a finger action as indicated in FIG. 7, whereby said handle 30 is moved to its extended position.

The operation of the invention in connection with ice fishing, from the description herein, is believed to be well understood.

The skimmer 20 is used to keep ice fishing holes open by breaking up ice layers as they form in the ice hole being used. Said skimmer is shown to be perforate.

The gaff hook is utilized to hook and draw fish up through an ice hole.

For storage and general handling, the invention is handy to have in its retracted position, however when extension is required, the handle portions are pulled apart and become automatically locked as even with the swing of one arm, the handles may be extended and locked into position.

It will of course be understood that various changes may be made in the form, details, arrangement and porportions of the apparatus and in the steps and sequence of steps of the method without departing from the scope of the applicant's invention which, generally stated, consists in an apparatus and method capable of carrying out the objects above set forth, such as disclosed and defined in the appended claims.

What is claimed is:

1. A combination fishing device comprising
at least two handle sections,
said handle sections having remote ends and overlapping end portions,
the remote ends each repsectively carrying a fishing device,
a first of said handle sections having a reversely angled overlapping end portion forming a top wall and an outer side wall,
said top wall having an opening therethrough,
a spring member carried within said angled end portion,
means securing said spring,
said spring comprising overlapping body portions spaced apart under tension,
a second of said handle sections having its overlapping end portion disposed through said opening in said top wall,
a plate member carried at the overlapping end of said second handle section,
an opening through said plate member,
said first handle section being disposed through said opening overlapping said first handle section,
said second handle section having an annular groove spaced somewhat from said plate member,
whereby extension of said handle section relative to each other aligning said groove with said spring causes said spring to releasably lockingly engage said groove and fix said handle sections in extended position.

2. A combination fishing device comprising
a first and second handle section,
said handle sections having free ends and overlapping end portions,
said free ends each carrying a fishing device,
the first of said handle sections having an angled overlapping end portion forming a top wall,
said top wall having an opening therethrough,
an automatic gripping means carried by said first handle section adjacent said top wall,
the second handle section having its overlapping end portion slidably disposed through said gripping means,
a plate member carried at the free end of the overlapping end portion of said second handle section,
said plate member being disposed at right angles to the axis of said second handle section,
an opening through said plate member,
said first handle section having its overlapping end portion extending through said opening,
said second handle section having an annular groove spaced somewhat from said plate member,
whereby, upon extension of said handles relative to each other aligning said groove and said gripping means, said gripping means engages said slot and automatically releasably locks said handle sections in extended position.

3. The structure of claim 2, wherein
said gripping means comprises a spring member,
said spring member having overlapping portions under tension engaging said second handle sections under the pressure of said tension.

4. The structure of claim 2, wherein
said first of said handle sections comprises a flat plate member.

5. The structure of claim 2, wherein
said second of said handle sections being cylindrical in form.

6. The structure of claim 2, wherein
said fishing device at said free end of said second handle section comprises a gaff hook.

7. The structure of claim 2, wherein
said fishing device at said free end of said first handle section comprises a perforate plate member.

* * * * *